United States Patent [19]

Ngai et al.

[11] Patent Number: 4,868,739
[45] Date of Patent: Sep. 19, 1989

[54] FIXED CLOCK RATE VECTOR PROCESSOR HAVING EXCLUSIVE TIME CYCLE CONTROL PROGRAMMABLE INTO EACH MICROWORD

[75] Inventors: Chuck H. Ngai; Gerald J. Watkins, both of Endwell, N.Y.

[73] Assignee: International Business Machines Corporation, Armonk, N.Y.

[21] Appl. No.: 859,557

[22] Filed: May 5, 1986

[51] Int. Cl.⁴ .......................... G06F 9/38; G06F 9/22; G06F 9/28

[52] U.S. Cl. .................................... 364/200

[58] Field of Search ... 364/200 MS File, 900 MS File

[56] References Cited

U.S. PATENT DOCUMENTS

| | | | |
|---|---|---|---|
| 3,868,499 | 2/1975 | Aaronson et al. | 364/498 |
| 3,930,236 | 12/1975 | Ferguson et al. | 364/200 |
| 3,969,703 | 7/1976 | Kwiatkowski et al. | 364/900 |
| 4,032,895 | 6/1977 | Lanza et al. | 364/200 |
| 4,099,229 | 7/1978 | Kancler. | |
| 4,172,281 | 10/1979 | Gordon | 364/200 |
| 4,179,737 | 12/1979 | Kim | 364/200 |
| 4,241,418 | 12/1980 | Stanley | 364/900 |
| 4,366,540 | 12/1982 | Berglund et al. | 364/200 |
| 4,396,980 | 8/1983 | Hingarh | 364/200 |
| 4,412,300 | 10/1983 | Watson et al. | |
| 4,435,757 | 3/1984 | Pross, Jr. | 364/200 |
| 4,439,829 | 3/1984 | Tsiang. | |
| 4,456,964 | 6/1984 | Olander, Jr. et al. | |
| 4,458,308 | 7/1984 | Holtey et al. | 364/200 |
| 4,509,120 | 4/1985 | Daudelin | 364/200 |

*Primary Examiner*—Archie E. Williams, Jr.
*Assistant Examiner*—Leo L. Wang
*Attorney, Agent, or Firm*—David S. Romney; Mark Levy

[57] ABSTRACT

A method is provided for optimizing performance in a fixed clock rate computer system. A control word is provided having a control portion for operational instructions and a programmable timing portion. The programmable timing portion includes a value representative of the sum of execution time and inter-execution delay time. A counter is provided for receiving the value representative of the execution and inter-execution times. The counter is capable of generating a signal to indicate an end of decrementing operation. The operational instructions are executed simultaneously with the processing of the time value in the counter so that a subsequent instruction is executed only when an end of operation signal is received from the counter.

15 Claims, 4 Drawing Sheets

FIXED CLOCK RATE VECTOR PROCESSOR HAVING EXCLUSIVE TIME CYCLE CONTROL PROGRAMMABLE INTO EACH MICROWORD

This application is related to copending patent application filed Sept. 9, 1983, Ser. No. 530,842 for "High Performance Parallel Vector Processor," assigned to the present assignee.

BACKGROUND OF THE INVENTION

The present invention relates to a method for optimizing computer system performance and, in particular, to optimizing computer system performance by programming micro word cycle length.

In sophisticated computer systems, especially in larger processors, there is often a need to execute a great number of operations in the shortest possible time. It has been found that as cycle length (i.e., the time required to perform the most simple operation) decreases to the millisecond and even nanosecond range, even a short delay time between executions of operations can become a significant factor in overall system operation. When thousands or millions of operations are performed each second, an inefficient or wasteful segment of time on a cycle level grows to an appreciable degradation of system performance when multiplied by hours, months or years.

In systems that have a plurality of processors or one or more processors used in conjunction with a plurality of other (e.g., peripheral) devices, it would be helpful to predict the amount of time required to perform certain operations, thus eliminating a requirement for processors to be inactive or non-operational while such operations are performed.

The prior art is replete with examples of inadequate solutions to the aforementioned problem. Predetermining the amount of delay time for a processor for each operation, for example, can result in estimating too short a time, in which case secondary devices connected to the processor may have insufficient time to complete their respective operations, resulting in malfunctions. In order to allocate enough time for secondary devices to execute their tasks, too much time may be reserved, resulting in occasional or even chronic delay. Obviously, neither of these cases represents optimum performance efficiency.

The aforementioned problem is especially troublesome in a vector processor, which typically includes a plurality of vector registers, each vector register storing a vector having a plurality of vector elements. A pipeline processing unit is connected to a selector associated with the vector registers for receiving corresponding elements of a first vector from a first vector register and utilizing the corresponding elements to perform an arithmetic operation on the corresponding elements of a second vector stored in a second vector register. The results of the arithmetic operation are stored in corresponding locations of one of the vector registers or in corresponding locations of a third vector register.

As a result of increasing sophistication of computer systems, the need exists to increase the performance of the vector processor portion of the computer system by decreasing time required to process or perform arithmetic operations on each of the corresponding elements of the plurality of vectors stored in the vector registers. If the vectors include 128 elements, for example, 128 operations must be performed in sequence. The time required to complete operations on all 128 elements of the vector is a function of the cycle time per operation of the pipeline unit as it operates on each of the corresponding elements.

Each operation can require a unique predetermined time period in which to execute. Moreover, each secondary device has certain characteristics. So the cycle length value is a function both of the vector processor operating characteristics and of the secondary device.

U.S. Pat. No. 4,456,964 issued to Olander, Jr. et al and U.S. Pat. No. 4,412,300 issued to Watson et al disclose an electronic calculator that contains micro instructions and codes to perform basic functions of the calculator. The micro instructions include a plurality of coded and non-coded micro instructions for transferring control to an input/output control unit, for controlling the addressing and accessing of a memory unit, and for controlling the operation of two accumulator registers, a program counter register, an extend register and an arithmetic logic unit. The micro instructions also include a plurality of clock codes for controlling the operation of a programmable clock, a plurality of qualifier selection codes for selecting qualifiers and serving as primary address codes for addressing the read only memory of the microprocessor and a plurality of secondary address codes for addressing the read only memory of the microprocessor. The micro words can be programmed for shift register timing.

U.S. Pat. No. 4,439,829 issued to Tsiang discloses a data processing machine having cache memory and a management system therefor. The length of a micro instruction cycle of a central processor varies according to the nature of the micro instruction. To determine the number of pulses to be generated for a cycle, control signals of the micro instruction controlling central processor are input therefrom to a decoder and counter. A hardware decoder is therefore required for operation of the Tsiang system.

U.S. Pat. No. 4,099,229 issued to Kancler discloses a variable architecture digital computer. An increment multiple cycle counter (IMCC) bit or field increments a multiple cycle counter in a control module which is used in operations requiring repetition of a set of micro instructions such as shifting or multiplying. The clock signal in conjunction with a 2-bit micro multiplexer (MMX) field reduces the system clock rate so that operations which encounter extensive logic delays within the computer may be used. In the Kancler system, a value must be first placed in a counter. Then timing information with data can be loaded into each micro word.

It would be advantageous to provide a system for allowing certain time values to be programmed within a micro word so that there will be a minimum amount of time wasted between operations.

It would be advantageous to match or correlate such programmable delay time to the optimal response time or performance time of other components.

Moreover, it would be advantageous to provide a system for predetermining the amount of time per instruction required for complete operation or execution.

It would also be advantageous to provide a system in which delay time or execution time could be integrally carried with the micro word instruction corresponding thereto.

It would also be advantageous to provide a timing or counting mechanism to generate a signal to indicate when a predetermined time interval has expired.

It would further be advantageous to provide a system that allows processor operations to be performed while a timing or counting mechanism measures a predetermined time interval.

It would also be advantageous to provide a system that allows a processor to execute a subsequent instruction when a counting mechanism indicates that the time interval required for execution of the previous instruction has expired.

SUMMARY OF THE INVENTION

In accordance with the present invention there is provided a method for optimizing performance in a fixed clock rate computer system. A control word is provided having a control portion for operational instructions and a programmable timing portion. The programmable timing portion includes a value representative of the sum of execution time and inter-execution delay time. A counter is provided for receiving the value representative of the execution and inter-execution times. The counter is capable of generating a signal to indicate an end of decrementing operation. The operational instructions are executed simultaneously with the processing of the time value in the counter so that a subsequent instruction is executed only when an end of operation signal is received from the counter.

BRIEF DESCRIPTION OF THE DRAWINGS

A complete understanding of the present invention may be obtained by reference to the accompanying drawings, when taken in conjunction with the detailed description thereof and in which:

FIG. 2 (consisting of FIGS. 2A and 2B) illustrates a parallel vector processor;

DETAILED DESCRIPTION OF THE PREFERRED EMBODIMENT

Figure 1:
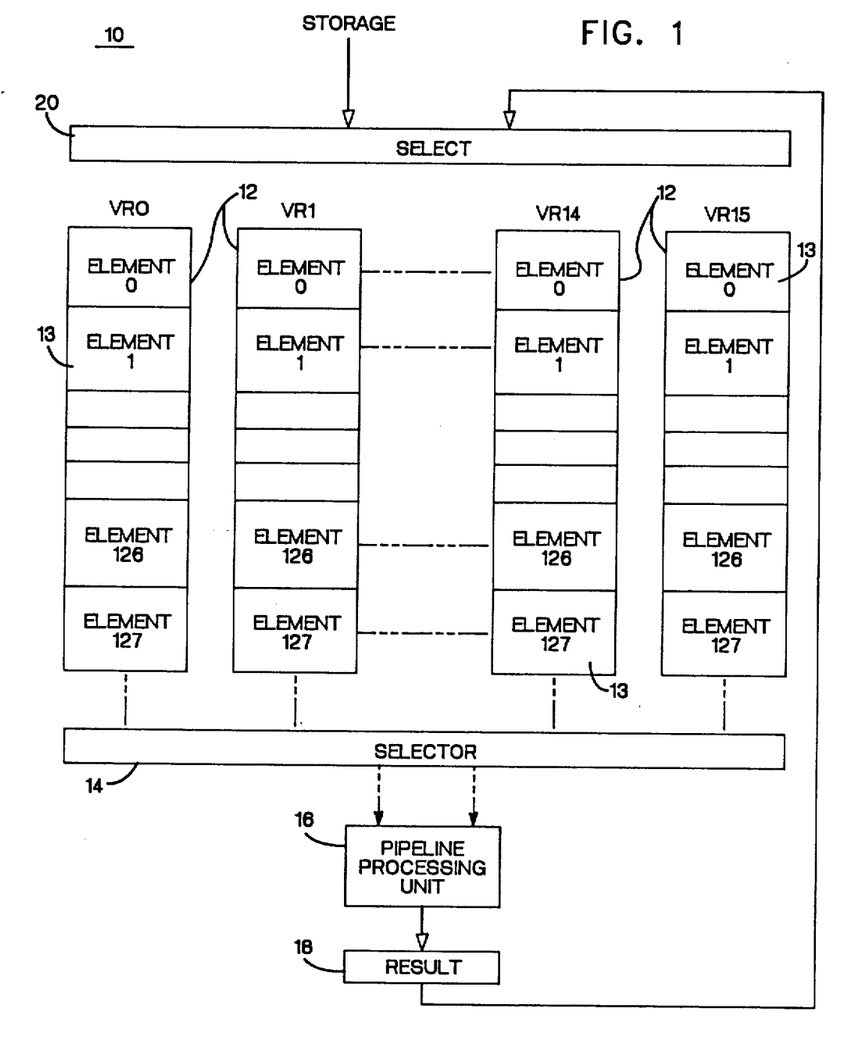
FIG. 1 illustrates a vector processor.

Referring now to FIG. 1, a pipeline vector processor 10 is illustrated. A plurality of vector registers 12 (VR0 through VR15) are shown, each register storing 128 vector elements 13 (elements 0 through 127). In the preferred embodiment, an element 13 comprises a four byte binary word. A selector 14 is connected to each of the vector registers 12 for selecting corresponding elements 13 from the vector registers 12 and for gating the selected elements 13 through to a pipeline processing unit 16.

The pipeline processing unit 16 is connected to the selector 14 for receiving the corresponding elements 13 and for performing selected operations thereon, such as arithmetic operations. For example, the processing unit 16 may receive element 0 from vector register VR0 and corresponding element 0 from vector register VR15 and may perform the following arithmetic operation on said elements:

$$VR0 + VR15 \rightarrow VR3.$$

In this arithmetic operation, each bit of element 0 in VR0 is added to each respective bit of element 0 in VR15. The resultant sum is stored in the element 0 position of vector register VR3.

A result register 18 is connected to the pipeline processing unit 16 for storing the resultant sum received therefrom. The resultant register 18 is connected to each of the vector registers 12 via a select gate 20 for transferring the resultant sum, in the aforementioned example, from the result register 18 to the appropriate vector register, in this case VR3.

Utilizing the example, a first element 13 is selected from register VR0 and a corresponding element 13 is selected from register VR15. The elements 13 are added. Second elements 13 are selected from each of registers VR0 and VR15 respectively and are also added. Each of the 128 elements 13 must be selected from registers VR0 and VR15 and added together, in sequence, in order to complete processing. As a result, the time required to complete the processing of the vectors stored in vector registers VR0 and VR15 is a function of the number of elements 13 per vector and the cycle time required to process a set of corresponding elements 13 per vector. The overall performance of a vector processor can thus be improved by decreasing the time required to process every pair of vectors stored in a set of vector registers 12.

Figures 2, 2B:
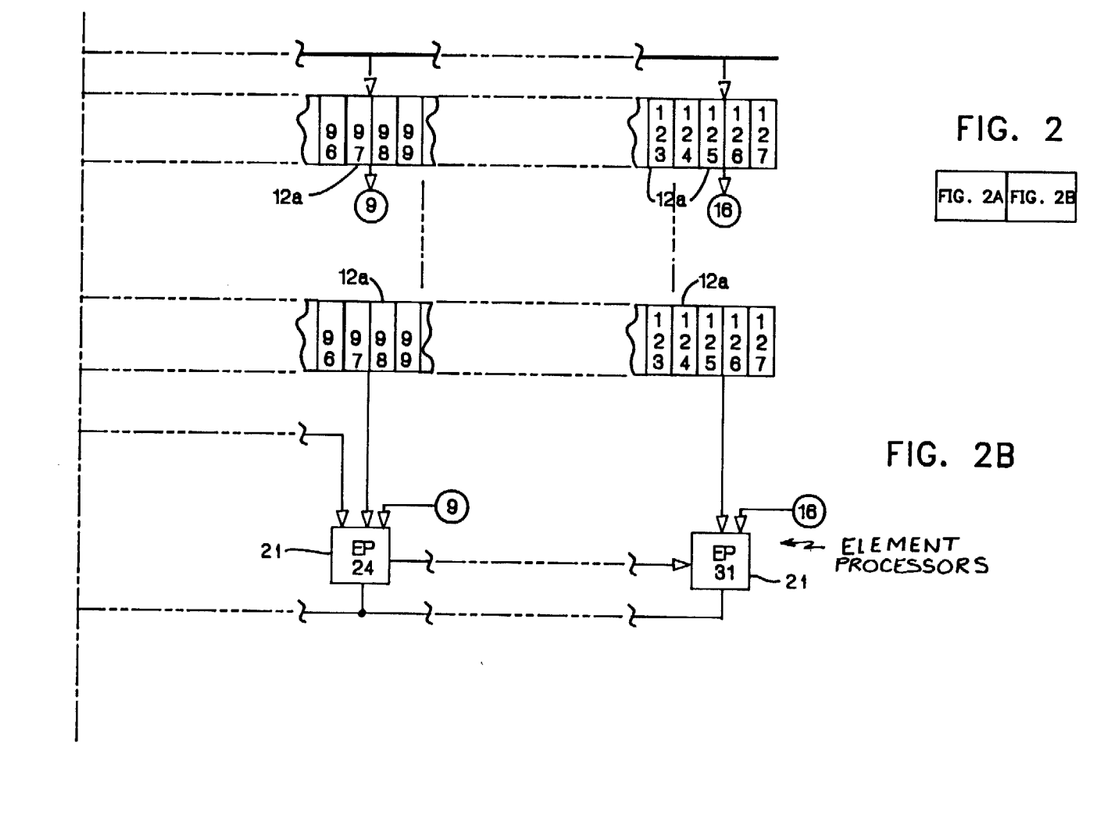
Figure 2A:
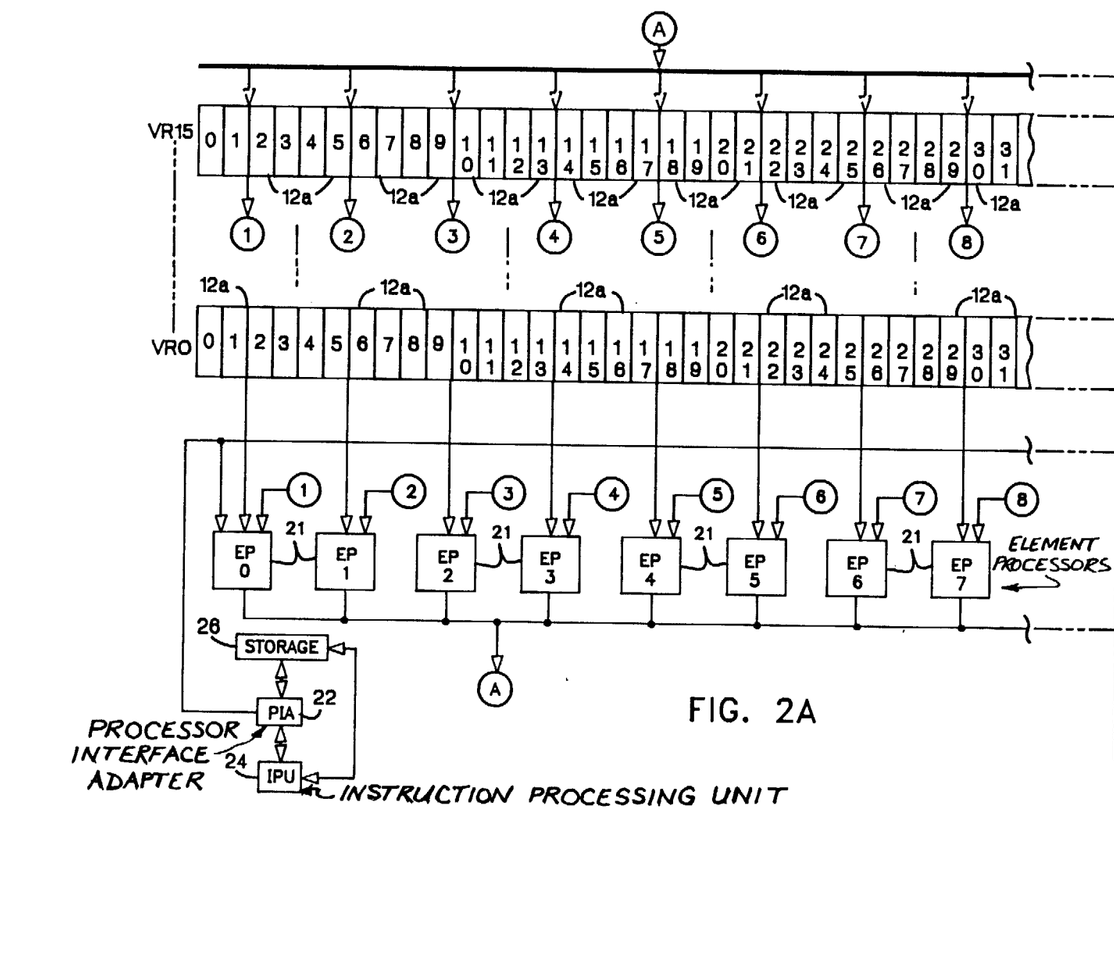

Referring now also to FIG. 2, a parallel vector processor is illustrated in which each of the vector registers VR0 and VR15 are subdivided into a plurality of smaller registers 12a, each smaller register 12a containing four elements. A corresponding plurality of element processors 21 are connected to the plurality of smaller registers 12a for performing processing (arithmetic) operations on the corresponding elements of the vectors stored in the registers 12. Each of the element processors 21 performs processing operations on four corresponding elements of the vector registers 12. The results of the processing operation are simultaneously produced by each element processor (EP) 21, in parallel, and may be stored in corresponding locations of any one of the vector registers VR0 through VR15.

Figure 3:
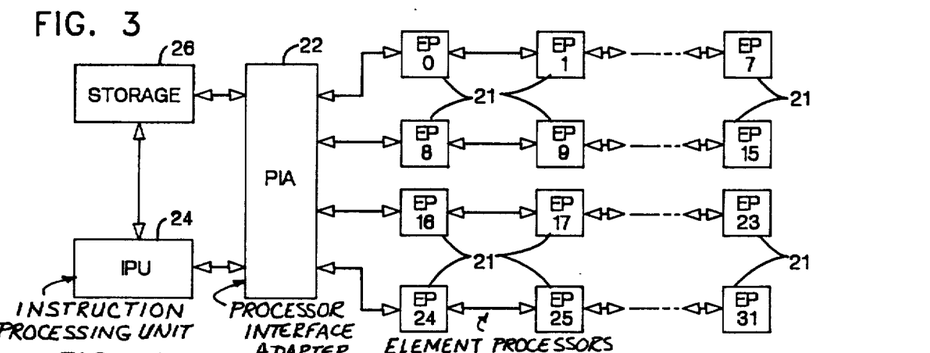
FIG. 3 illustrates the connection of a processor interface adaptor to each of the element processors of FIG. 2.

A processor interface adaptor (PIA) 22 is connected to all of the element processors 21 for transmitting address, data and command information thereto. The actual connection of the PIA 22 to each of the element processors 0-31 is illustrated in FIG. 3 of the drawings, as hereinbelow described. An instruction processing unit (IPU) 24 is connected to the PIA 22 for transmitting vector instructions thereto. A main memory or storage 26 is connected to the PIA 22 for transmitting data information and address control information to the PIA 22 in response to its request for such data.

Referring now also to FIG. 3, the separate connections of the PIA 22 to each of the element processors 21 (processor 0 through processor 31) is illustrated. The PIA 22 is directly connected to element processors 0, 8, 16 and 24. Element processor 0 is in turn serially connected to element processors 1 through 7, processor 8 to processors 9 through 15, processor 16 to processors 17 through 23 and processor 24 to processors 25 through 31.

Figure 4:
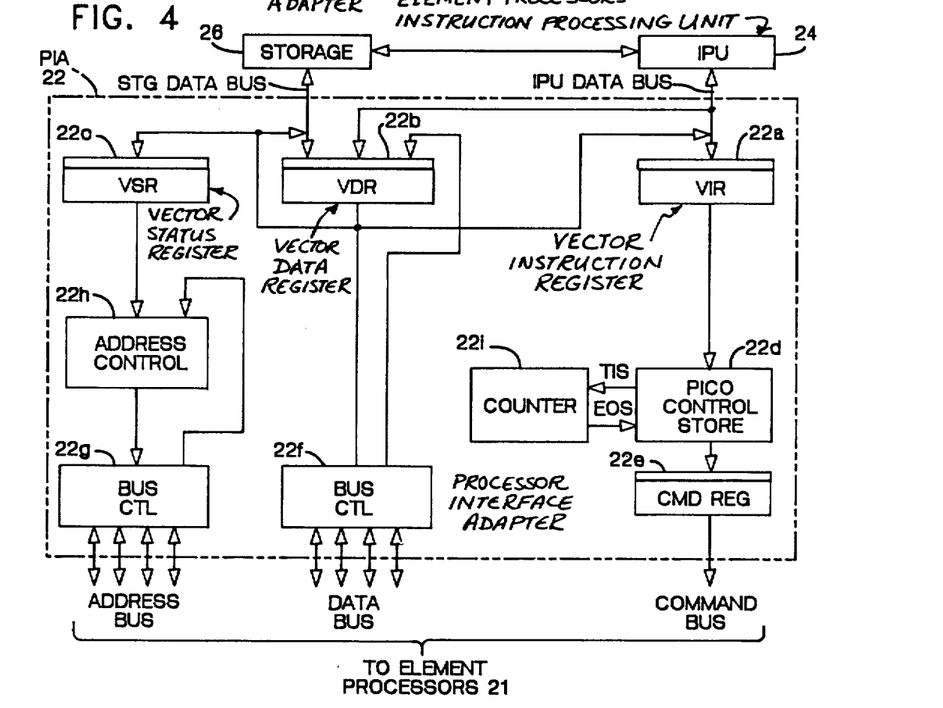
FIG. 4. illustrates the construction of the processor interface adaptor of FIGS. 2 and 3.

Referring now also to FIG. 4, the construction of the PIA 22 is illustrated. The PIA 22 includes a vector instruction register (VIR) 22a connected to the IPU 24 for receiving a vector instruction therefrom and for temporarily storing the vector instruction. A vector data register (VDR) 22b is connected to storage 26 and to the IPU 24 for receiving data therefrom and for temporarily storing the data. A vector status register (VSR) 22c is also connected to the storage 26 and to the IPU 24 for receiving address control information from storage and for temporarily storing the information.

A pico control store 22d (the designation pico is used to differentiate 22d l from the IPU control store) is connected to the VIR 22a for decoding the vector instruction stored in the VIR 22a and for selecting a pico control routine residing in the store 22d. A command register 22e is connected to the pico control store 22d and to the element processors 21 via a command bus for driving the element processors 21. Also connected to the pico control store 22d is a counter 22i having a timer initiation signal (TIS) line for loading a value generated by the store 22d and an end of operation signal (EOS) line for transmitting an end of operation signal to the store 22d, as hereinbelow described.

A bus control 22f is connected to the VDR 22b for receiving data from the VDR 22b and for transmitting the data to the element processors 21 via a data bus. The bus control 22f can also steer data from one element processor 21 to another.

The VSR 22c is also connected to a bus control 22g via an address control 22h. The address control 22h generates addresses corresponding to the data received from the VSR 22c. The bus control 22g transmits the generated addresses to the element processors 21 via an address bus.

In operation, the IPU 24 instructs the PIA 22 to load specific data into vector registers VR0 through VR15. The IPU 24 transmits a LOAD instruction to the PIA 22. The LOAD instruction is temporarily stored in the VIR 22a. The data to be loaded into the vector registers 12 resides in storage 26. When the PIA 22 receives the LOAD instruction, it retrieves specific data from storage 26 and loads said data into the VDR 22b.

Prior to the issuance of the LOAD instruction, the IPU 24 has loaded address control information into the VSR 22c. As a result, specific address information is generated by the address control 22h. The address information comprises the address of selected element processors 21 into which the data is to be loaded. The address information also comprises the address of elements 13 associated with the selected element processors 21 into which the data is to be stored. The LOAD instruction, stored in the VIR 22a, is decoded by the pico control store 22d. Command information corresponding to the LOAD instruction stored in the pico control store 22d is selected.

In accordance with the address information generated by the address control 22h, the data stored in the VDR 22b is transmitted for storage in the selected processors 21 via the bus control 22f and associated data bus. Furthermore, in accordance with the address information generated by the address control 22h, the command information stored in the pico control store 22d and selected by the decoded LOAD instruction is transmitted to the selected processors 21 via command register 22e and associated command bus. The selected command information causes the data stored in the selected processors 21 to be loaded into elements of the smaller registers 12a, the elements being identified by the address information generated by the address control 22h.

By way of example, assume that a 128 element vector is stored in each of vector registers VR0 and VR15. An element comprises a four byte binary word. Assume further that the following vector arithmetic operation is to be performed on the vectors stored in vector registers VR0 and VR15:

$$VR0 + VR15 \rightarrow VR15.$$

The IPU 24 instructs the PIA 22 to perform an ADD operation wherein the vector stored in vector register VR0 is to be added to the vector stored in vector register VR15, the result now to be stored in vector register VR15, replacing its original contents.

The IPU 24 transmits the ADD instruction to the PIA 22. The ADD instruction is temporarily stored in the VIR 22a. In accordance with the ADD instruction, particular command information residing in the store 22d is selected. As the ADD instruction is received by the PIA 22, the IPU 24 retrieves specific data from storage 26 representative of the addresses of the elements 13 in the smaller registers 12a undergoing the ADD operation and the address of the selected processors 21 which will perform the ADD operation. As a result, address information is generated by the address control 22h.

The address information is transmitted to the selected processors 21 via the bus control 22g and associated address bus. In accordance with this address information, the selected command information selected from the pico control store 22d instructs the selected processors 21 to retrieve the selected elements 13 of associated smaller registers 12a corresponding to vector registers VR0 and VR15.

When the elements 13 are retrieved, the selected command information causes the selected processors 21 to execute the ADD instruction. For example, elements 0 through 3 associated with the vectors stored in vector registers VR0 and VR15 are received by element processor number 0. Element processor 0 adds the corresponding elements together and, in accordance with the selected command information, stores the results of the addition operation in the corresponding locations of vector register VR15. That is, element 0 of vector register VR0 is added to element 0 of vector register VR15 and the sum is now stored in the element 0 location of vector register VR15.

Elements 1, 2 and 3 of vector registers VR0 and VR15 are similarly added together, the sums being stored in the element 1, 2 and 3 locations of vector register VR15. Elements 4, 5, 6 and 7 associated with vector registers VR0 and VR15 are processed by element processor 1 in the same manner as described above, the processing of these elements 13 being performed simultaneously with the processing of elements 0, 1, 2 and 3.

The remaining elements 13 of the vectors, stored in vector registers VR0 and VR15, are processed simultaneously by element processors 2 through 31 in groups of four elements 13 each. As a result, the vector arithmetic operation performed on all the vectors stored in vector registers VR0 and VR15 is completed in the time required to process only four elements of the vector.

Figure 5:
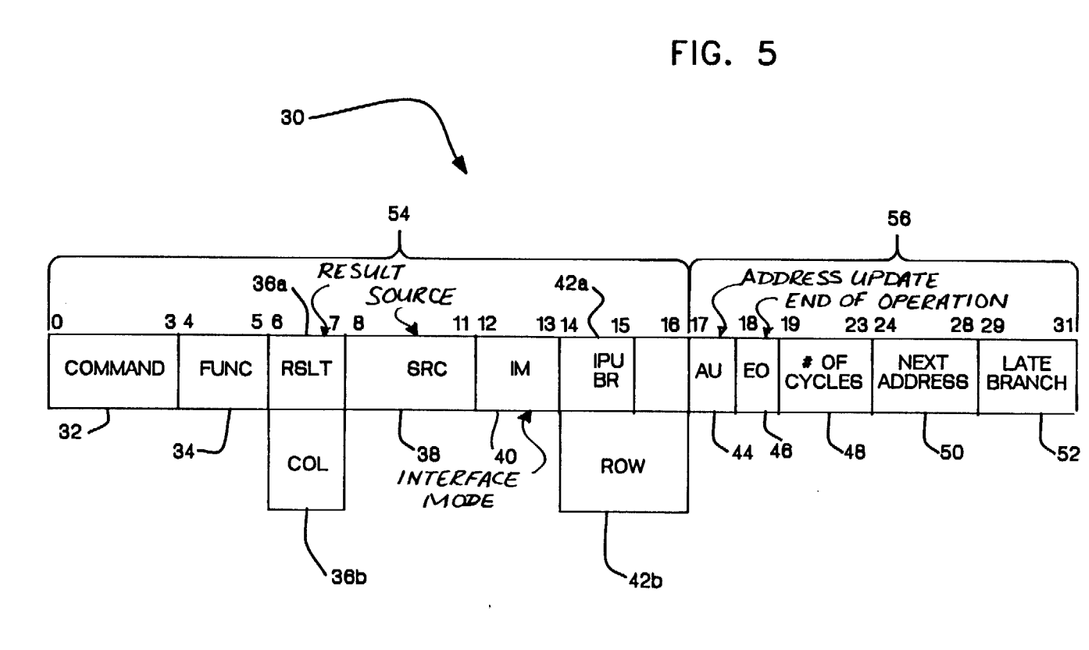
FIG. 5 illustrates a control word in accordance with the present invention.

Referring now also to FIG. 5, there is shown a control word 30 in accordance with the present invention. The control word 30 resides in the pico control store 22d (FIG. 4). The control word 30 has 32 bits and is divided into two portions. The first portion, identified by reference numeral 54, contains operational instructions. The second portion 56 contains control and timing information.

Bits 0–3 are used to identify a command 32. Bits 4–5 indicate a function 34. Bits 6–7 indicate a result (RSLT) 36a or a column 36b depending upon the command 32 that is used in the control word 30. Bits 8–11 indicate the identity of a data source (SRC) 38.

Bits 12–13 represent the interface mode (IM) 40. An interface mode may be a single processor (SP) mode, or a broadcast (BC) mode or a broadcast auto (BA) mode or an interprocessor (IP) mode or the like. The single processor mode represents a system in which one processor responds and executes the command sent to it. In broadcast mode, all processors are directed to operate on one set of instructions. The broadcast auto mode requires the use of a pipelining technique for all processors to operate on the same operating instructions. Thus, the difference between broadcast (BC) mode and broadcast auto (BA) mode is that the BC mode requires the execution once for all of the processors whereas the BA mode provides for multiple executions for all of the processors by means of the pipelining technique. In other words, the SP mode operates on one element; the BC mode operates on n elements, where n is the number of processors; and the BA mode operates as a sequence of BC operations in a pipelined fashion. The interprocessor (IP) mode provides for one processor to communicate by passing an operand to another processor for execution therein.

Bits 14–15 represent IPU branch conditions 42a, while bits 14–16 can be used, depending upon the command 32 specified in bits 0–3, to identify a row 42b. Thus, depending on the control word command 32, bits 6–7 and 14–16 are interpreted in one of two ways, the second of which identifies columns and rows, respectively.

Bit 17 is an address update (AU) bit 44. Bit 18 is an end of operation (EO) bit 46. Bit 17 and 18 are used for internal control in the PIA 22.

Bits 19–23 represent the programmable micro word cycle time 48. This is the value that indicates the number of cycles required to perform a specified command 32 by a given secondary or peripheral device, such as an array of element processors 21 (FIG. 3). The value stored in bits 19–23 is normally preloaded by a programmer. This value is the sum of execution time and inter-execution delay time.

Bits 24–28 represent the address for the next word 50. Thus, words need not be executed sequentially. Bits 29–31 represent a branch condition 52 based upon the outcome of execution of the current command 32.

The operational instruction portion 54 of the control word 30 is transmitted to, and used by, any one of the element processors 21 (FIG. 3). Bits 17 and 18, representing the address update bit 44 and end of operation bit 46, and the rest of the control portion 56 of the control word 30 remain in, and are used by, the PIA 22.

The counter 22i connected to the pico control store 22d processes values representative of the number of cycles 48 in the control word 30. In operation, when the control word 30 is executed, the operational instruction portion 54 thereof is transferred to the element processors 21 via the command register 22e and associated command bus at the same time that the control and timing portion 56 is used within the PIA 22. In particular, the pico control store 22d transfers the value 48 residing in the number of cycles bits 19–23 to the counter 22i over the TIS line. The counter 22i, in turn, begins a decrementing operation, as is well known in the art, beginning at the value 48 loaded therein. When the counter 22i decrements to zero, it generates an end of decrementing operation signal and transmits that signal over the EOS line to the pico control store 22d.

The store 22d is now in a position to begin execution of the next control word 30.

Thus, only when the predetermined time interval, as represented by the value 48 preprogrammed and stored in the control word 30, expires does the next word, whose address 50 is also stored in the control word 30, begin execution. This next execution is initiated by transferring the operational instruction portion 54 of the control word 30 to the specified element processors 21 via the command register 22e and associated command bus. The new value 48 representing another time interval is transferred to the counter operations, to be terminated when the counter value reaches zero. The counter 22i then generates its end of decrementing operation signal and sends that signal over the EOS line to the pico control store 22d.

When the value 48 in the control word 30 is calculated with care by a programmer, the counter 22i reaches zero and generates an end of decrementing operation signal over the EOS line when or shortly after execution of the operational instruction portion 56 of the control word 30 has been completed. Thus, overall system efficiency is improved due to an improvement of individual operations on the micro word level.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

We claim:

1. A method for optimizing efficiency and performance in a general purpose computer system which includes a vector processor having a fixed clock rate, including the steps of:

providing a plurality of binary instruction words all having the same non-variable length, some of which require different time periods to complete execution of the instruction word by the vector processor;

encoding each of the binary instruction words with an operational field of bits occupying a first portion of the word and a control field of bits occupying a second portion of the word, without any overlapping between the first and second portions of the word;

programming a group of time control bits located in the second portion of the word with a value that indicates the number of fixed clock cycles required for both inter-execution delay time as well as the time needed for the vector processor to execute the operational field of bits;

selecting a sequence of the binary instruction words without altering any of the encoded bits in the operational field and without altering any of the encoded bits in the control field; and executing one at a time each of the binary instruction words chosen by said selecting step, with the value in the time control bits solely determining the end of the time period for said executing of the operational field of bits in one instruction word and the beginning of the time period for said executing of the operational field of bits in the next instruction word in sequence.

2. The method in accordance with claim 1 wherein the value representative of the sum of execution time and inter-execution delay time is a function of machine cycle time and said operational instruction.

3. The method in accordance with claim 1 wherein both of said operational and control bits are embedded in object code.

4. A fixed clock rate vector processor computer system having a plurality of fixed length binary instruction words including operational instructions and exclusive time value instructions, comprising:
- a plurality of devices capable of executing operational instructions;
- interfacing means coupled to each of said devices for the individual control thereof;
- counting means for processing a time value stored therein; such that a subsequent operational instruction is executed by each of said plurality of devices only when and immediately after said time value processing is completed.

5. The vector processor computer system in accordance with claim 4 wherein said plurality of devices capable of executing operational instructions are processors.

6. The vector processor computer system in accordance with claim 5 wherein said interfacing means is a processor interface adaptor.

7. The method in accordance with claim 1 wherein a plurality of processors executes said operational instruction residing in the first portion of said binary word.

8. The method in accordance with claim 1 wherein said executing step is accomplished through an interfacing means connected to a plurality of processors.

9. The method in accordance with claim 8 wherein said interfacing means includes a processor interface adapter.

10. The method of claim 1 wherein said providing step further includes providing binary instruction words with thirty-two bits and wherein said programming step includes programming five time control bits.

11. The method of claim 1 wherein said encoding step further includes encoding an operational field of bits occupying approximately half of the total bits in the binary instruction word.

12. The method of claim 1 wherein said encoding step further includes encoding several different types of operational instructions in the first portion of the word including but not limited to commands, functions, data source identities, and branch conditions.

13. The method of claim 12 wherein said different types of operational instructions always occupy the same bit position in the first portion of the word.

14. The method of claim 12 wherein at least one bit field in the first portion of the word can be encoded with one or the other of two types of operational instructions.

15. The method of claim 1 wherein the time period for completing execution of one instruction word is varied only by re-programming the group of time control bits in that instruction word.

* * * * *